(12) United States Patent
Maples et al.

(10) Patent No.: US 6,284,343 B1
(45) Date of Patent: Sep. 4, 2001

(54) LOW SMOKE, LOW TOXICITY CARPET

(75) Inventors: Dennis Maples, Bonner Springs; George Danker, Olathe, both of KS (US); David Campanella, North Kansas City, MO (US)

(73) Assignee: Akro Fireguard Products, Inc., Lenexa, KS (US)

( * ) Notice: Subject to any disclaimer, the term of this patent is extended or adjusted under 35 U.S.C. 154(b) by 0 days.

(21) Appl. No.: 09/419,856

(22) Filed: Oct. 19, 1999

Related U.S. Application Data

(63) Continuation of application No. 09/060,791, filed on Apr. 15, 1998, now abandoned.

(51) Int. Cl.$^7$ .............................. B32B 3/02; B32B 33/00; D03D 27/00; D04H 11/00; D05C 17/00
(52) U.S. Cl. .............................. 428/97; 524/416; 524/56; 524/430; 524/387
(58) Field of Search .................. 524/416, 56, 387, 524/430; 428/97

(56) References Cited

U.S. PATENT DOCUMENTS

| | | | |
|---|---|---|---|
| 3,803,063 | 4/1974 | Krentz, Jr. ...................... | 260/2.5 AJ |
| 4,216,261 | 8/1980 | Dias ....................... | 442/84 |
| 4,254,177 | 3/1981 | Fulmer .................. | 428/256 |
| 4,317,889 | 3/1982 | Pcolinsky, Jr. ......... | 521/107 |
| 4,349,494 | 9/1982 | Fulmer .................. | 264/45.3 |
| 4,374,207 | 2/1983 | Storie et al. .......... | 521/107 |
| 4,404,297 | 9/1983 | Fishler et al. ......... | 523/179 |
| 4,514,524 | 4/1985 | Fesman ................. | 521/107 |
| 4,529,742 | 7/1985 | von Bonin et al. ....... | 521/107 |
| 4,966,920 | 10/1990 | Gainer et al. ............ | 521/99 |
| 4,992,481 | * 2/1991 | von Bonin et al. .......... | 521/54 |
| 5,162,394 | * 11/1992 | Trocino et al. ......... | 523/208 |
| 5,288,549 | 2/1994 | Zeitler et al. .......... | 428/318.6 |
| 5,618,605 | * 4/1997 | Shore ................... | 428/92 |
| 5,749,948 | * 5/1998 | Scholz et al. ........... | 106/18.15 |

* cited by examiner

Primary Examiner—Samuel A. Acquah
Assistant Examiner—U. K. Rajguru
(74) Attorney, Agent, or Firm—Chase & Yakimo, L.C.

(57) ABSTRACT

A fire resistant carpet backing formulation has five components of:
  a) a polyurethane dispersion;
  b) fire retardant components having at least
    a) ammonium polyphosphate,
    b) melamine, and
    c) a char former;
  c) solvents including water;
  d) filler, pigment and grinding aids; and
  e) surfactants.

Preferred char formers are pentaerythritol and polysaccharides. The polyurethane dispersion is present in about 18–30% by weight, the fire retardant components of part (b) are present in about 39–61% by weight and the solvents of part (c) are present in about 9–25% by weight in the preferred embodiments. Nylon carpets made with this backing are fire retardant and meet the airline standards for fire safety.

24 Claims, No Drawings

LOW SMOKE, LOW TOXICITY CARPET

This application is a continuation of Ser. No. 09/060,791 filed Apr. 15, 1998 abandoned.

FIELD OF THE INVENTION

This invention relates to a fire retardant polyurethane resin formulation which is suitable for use as a carpet backing for nylon carpets.

BACKGROUND OF THE INVENTION

Aircraft carpeting can be made from a number of fibers. The two most commonly used for aircraft are wool and nylon. Nylon, in general, has become the preferred fiber for mechanical properties. Wool, historically, has been superior for fire safety.

The standards for fire safety purposes are imposed and monitored by governmental regulatory agencies such as FAA (United States—Federal Aviation Agency), CAA (Great Britain—Civil Aviation Authority—also recognized in parts of Europe), and JAA (Japan Aviation Authority). These apply to all airline operators under their respective jurisdiction. Fire safety standards are additionally maintained by airframe manufacturers such as Boeing, Airbus, McDonnell Douglas and others, and apply to all aircraft they manufacture.

Fire safety regulations vary worldwide. In parts of the world, particularly Europe and Asia, wool has been the only fiber that was able to meet all fire safety regulations, such as vertical burn, smoke and toxic gas emission requirements. In the United States, where fire safety requirements for carpet do not include smoke and toxicity standards, nylon dominates the market as the fiber of choice for aircraft carpet.

More specifically, it is mandatory that all carpet installed on any aircraft worldwide must pass the twelve second vertical burn test described in FAR 25.853(a), Appendix F, Part 1, (a) (1) (ii) and incorporated herein by reference. This is the FAA version of the vertical burn regulation which is generally recognized worldwide and which appears essentially verbatim in CAA, JAA, and other regulatory agencies' documentation.

In contrast to vertical burn, smoke emission and toxic gas emission are regulated differently throughout various parts of the world. For instance, Boeing and Airbus, as airframe manufacturers serving worldwide markets, maintain standards for smoke and toxic gasses. These airline manufacturers provide Supplier Furnished Equipment (SFE) carpet which is selected and installed by Boeing or Airbus as original equipment on their aircraft. For smoke emission and toxic gas emission, this carpet must meet the airline manufacturer's standard, such as Boeing's BMS 8.237C, BSS 7236 and BSS 7238 standards and Airbus' ATS-1000.001 ABD 0031 issue 5 standards, incorporated herein by reference.

These standards describe the smoke emission and toxicity test methods in detail. Generally, to meet the Airbus smoke emission and toxicity standards, a carpet sample (3"×3") is burned for four minutes in a burn chamber under both flaming and non-flaming conditions. To meet the smoke emission standard, the specific optical density ($D_s$) of the resulting smoke cannot exceed 150. To meet the toxicity requirements for smoke gases, the smoke in the chamber is tested for the presence of the following six gases which cannot be present in more than the following listed quantities:

|  | ppm w/in 4 minutes |
|---|---|
| Hydrogen Fluoride (HF) | 100 |
| Hydrogen Chloride (HCL) | 150 |
| Hydrogen Cyanide (HCN) | 150 |
| Sulfur Dioxide ($SO_2 + H_2S$) | 100 |
| Carbon Monoxide (CO) | 3500 |
| Nitrous Gases ($NO + NO_2$) | 100 |

The Boeing standards for smoke emission and toxicity are less stringent, but similar to Airbus' standards.

SUMMARY OF THE INVENTION

Accordingly, it is an object of this invention to provide a backing for textiles, particularly nylon carpet which, when applied to these materials, produces a construction that exhibits lower smoke and toxic gas emissions than current products.

It is a further object of this invention to provide a composition for treating carpet or fabrics so they meet flammability, smoke generation and toxic gas emission requirements for aerospace, mass transportation and housing markets.

It is a further object of this invention to provide a fire retardant composition for carpets and fabrics which is agreeable to the manufacturing process, is environmentally safe, exhibits a very low level of volatile organic compounds (VOCs) and is a single-component material making it compatible with many existing commercial application processes.

It is a further object of this invention to provide a fire retardant composition for carpets and fabrics in a single package formulation which can be used without specialized application equipment being required, requires no mixing, and decreases worker exposure to isocyanates for increased worker safety.

It is a further object of this invention to provide a fire retardant composition for carpets and fabrics in a water-based formula with very low initial toxicity, with low VOCs, and with a non-flammable formula for increased fire safety.

It is a further object of this invention to provide a fire retardant composition for carpets and fabrics which is fire resistant and which meets governmental and industry fire worthiness regulations for use worldwide.

It is a further object of this invention to provide a fire retardant composition for carpets and fabrics which has high penetration and high adhesion to lock in carpet fibers, is tough to assure dimensional stability and provide long service life, and is an elastomeric formulation to eliminate concerns about shrinkage.

It is a further object of this invention to provide a fire retardant nylon carpet.

These and further objects of the invention will become apparent as the description of the invention proceeds.

These objects are attained by providing a fire resistant carpet backing formulation has been made having the following components:
 a) a polyurethane dispersion;
 b) fire retardant components having at least
  a) ammonium polyphosphate,
  b) melamine, and
  c) a char former;
 c) solvents including water;

d) filler, pigment and grinding aids; and e) surfactants.

Preferred char formers are pentaerythritol and polysaccharides. The polyurethane dispersion is present in about 18–30% by weight, the fire retardant components of part (b) are present in about 39–61% by weight and the solvents of part (c) are present in about 9–25% by weight in the preferred embodiments. When this formulation is used to make a nylon carpet, the resulting carpet is fire retardant and meets the airline standards for fire safety.

DETAILED DESCRIPTION OF THE PREFERRED EMBODIMENTS

A carpet backing has been developed which enables nylon carpet to meet demanding fire safety requirements and thus permits European airline operators to enjoy the many benefits of nylon carpeting. The formula of this invention produces a backing for textiles, particularly nylon carpet which, when applied to these materials, produces a construction that exhibits lower smoke and toxic gas emissions than current products. Carpet or fabrics so treated meet flammability, smoke generation and toxic gas emission requirements for aerospace, mass transportation and housing markets. Additionally this product is environmentally safe, exhibiting very low VOCs and is a single-component material which makes it compatible with many existing commercial application processes.

The preferred formulation is set forth in Table 1 below. Each ingredient is numbered and a more detailed ingredient description as well as its function and source is given below the table.

TABLE 1

Preferred Formulation

| No. | Component | % by weight | % range |
|---|---|---|---|
| 1 | PR-240 main dispersion | 22.00 | 18–30 |
| 2 | Water | 8.75 | 5–15 |
| 3 | 2-Propanol | 4.00 | 3–6 |
| 4 | N-Methyl-2-Pyrrolidone | 1.70 | 1–4 |
| 5 | CT-131 dispersing agent | 1.00 | 0.5–1.5 |
| 6 | Lorama ECO R1 polysaccharide resin | 7.00 | 4–9 |
| 7 | Melamine | 10.00 | 7–13 |
| 8 | FR Cros 484 Ammonium polyphosphate | 30.00 | 25–35 |
| 9 | Pentaerythritol | 10.00 | 7–13 |
| 10 | 5099 black iron oxide | 1.00 | 0.5–1.5 |
| 11 | Dow Corning Antifoam "A" | 0.05 | 0.01–1.00 |
| 12 | Surfynol 465 surfactant | 0.50 | 0.1–1.0 |
| 13 | 4% aqueous dispersion of Rheox Bentone A. D. | 4.00 | 2–6 |

1. PR-240 is a proprietary solvent-free anionic aliphatic polyurethane dispersion in water. Typical resin solids are 38–42% with viscosity @ 25° C. Ford Cup of 10–50 seconds, with a specific gravity of 1.06 gm/cm$^2$, and a pH of 5–8. This is used as a binder for the nylon fibers of the carpet and to hold the other additives in place. This polyurethane dispersion exhibits low smoke and low toxicity when burned. PR-240 is a product of Bayer Industrial Chemicals.

2. Water is used as a diluent and for viscosity control. When the backcoating cures the water evaporates and is no longer present.

3. 2-Propanol is a commodity solvent used to reduce viscosity and adjust surface tension to help the polyurethane resin seek and bind to the nylon fibers. 2-Propanol evaporates during the curing and is not present in dried backing films.

4. N-Methyl-2-Pyrrolidone is a commodity solvent used to reduce viscosity and adjust surface tension to help the polyurethane resin seek and bind to the nylon fibers. N-Methyl-2-Pyrrolidone evaporates during curing and is not present in dried backing films.

5. CT-131 is a proprietary acetylenic, diol-based chemical used to enhance grinding and suspension of the additives. CT-131 is a product of Air Products and Chemicals Inc.

6. Lorama ECO R1 polysaccharide resin. This is a binder resin made of natural polysaccharides. It allows use of a wider range of polyurethane dispersions as a substitute for PR-240. It adds to fire resistance, it acts as an additional dispersing agent and it assists as a char former. Lorama ECO R1 is a product of Lorama Chemicals, Inc.

7. Melamine is a commodity chemical used as part of the fire retardant package. It is a spumescent that becomes gaseous when decomposed.

8. FR Cros 484 is a proprietary ammonium polyphosphate used as part of the fire retardant package. It acts as a catalyst to extinguish the flame when burned. FR Cros 484 is a product of Chemische Fabrik Budenheim.

9. Pentaerythritol is a commodity chemical used as part of the fire retardant package. It is used as a char former for flame extinguishing.

10. 5099 black iron oxide is used as a shading pigment. 5099 black iron oxide is a product of Harcros Chemical.

11. Dow Corning Antifoam "A" is a de-foaming product of the Dow Corning Company.

12. Surfynol 465 is a proprietary ethoxylated 2,4,7,90-tetramethyl 5 decyn-4,7-diol used for surface tension modification. Surfynol 465 is a product of Air Products and Chemicals, Inc.

13. Premix of 4% Bentone A.D. and 96% water. Bentone A.D. is a special clay filler that, when premixed with water, produces a gel-structured material that stabilizes the system, preventing settling without excessive thickening.

The polyurethane dispersion can be either a polyurethane polyether or a polyurethane polyester. The polyurethane can be either an aliphatic or aromatic polyurethane.

As seen from the ranges in the preferred compositions in Table 1, the polyurethane dispersion is present in about 18–30% by weight, the fire retardant components of part (b) are present in about 39–61% by weight and the solvents of part (c) are present in about 9–25% weight.

A further preferred composition is set forth in Table 2 where the various components of Table 1 are grouped by function.

TABLE 2

| | | |
|---|---|---|
| resin | | |
| 1 | PR-240 main dispersion | 22.00 |
| 6 | Lorama ECO RC1 | 7.00 |
| fire retardant components | | |
| 7 | Melamine | 10.00 |
| 8 | FR Cros 484 Ammonium polyphosphate | 30.00 |
| 9 | Pentaerythritol (char former) | 10.00 |
| solvents for permitting flow of the composition | | |
| 2 | Water | 8.75 |
| 3 | 2-Propanol | 4.00 |
| 4 | N-Methyl-2-Pyrrolidone | 1.70 |

TABLE 2-continued surfactants for the composition

| 11 | Dow Corning Antifoam "A" | 0.05 |
|---|---|---|
| 12 | Surfynol 465 surfactant | 0.50 | fillers, pigments, anti-settling and grinding aid

| 5 | CT-131 dispersing agent | 1.00 |
|---|---|---|
| 10 | 5099 black iron oxide | 1.00 |
| 13 | 4% aqueous dispersion of Rheox | 4.00 |

Having described the basic aspects of the invention, the following examples are given to illustrate specific embodiments thereof.

EXAMPLE 1

This example illustrates a preferred method of making a preferred formulation of the backing composition as basically set forth in Table 1.

In to a blending vessel with a high speed disperser such as a Cowles type dispersing blade for the deagglomeration of solids is added 22 parts by weight of PR-240, 6.0 parts water, 4.0 parts 2-propanol, 1.7 parts n-methyl-2-pyrrolidone, and 1.0 parts CT-131. The mixture is then agitated and allowed to mix five minutes. Then, 10.00 parts melamine, 30.00 parts FR Cros 484, 10.00 parts pentaerythritol, 1.00 parts black iron oxide pigment, 4.00 parts of a 4% aqueous dispersion of Rheox Bentone A.D. are added sequentially to the blending vessel. The resulting mixture is ground for 20 minutes to achieve the required dispersion.

Then, 0.05 parts Dow Corning Antifoam "A" and 0.5 parts Surfynol 465 surfactant are added and mixed for five minutes.

The viscosity is measured with a Brookfield RVT viscometer (spindle #4, 10 RPM). The viscosity is reduced using up to 2.75% water. Finished viscosity is 1500–2500 centipoise at 25° C. The solids content by weight should be 62–66%.

The finished carpet can be fabricated by applying the liquid backing composition to unfinished carpet which is known as "soft" or "greige" goods. The wet back coating is then cured in an oven.

There are a number of methods used commercially to apply uniform amounts of wet coating to the unfinished carpet. An advantage of the present backing composition is that it is compatible with all common application methods and does not rely upon a unique or uncommon type of application equipment. The backing may be directly applied to the backside of the carpet as it travels inverted through the coating station. The back coating is made uniform and driven into the carpet with a doctor blade set at the gap angle to produce the applied weight and penetration desired.

The back coating may also be applied by a pan and roller method. In this method, the carpet travels through the conveying station in a right-side-up orientation. The back coating is rolled into a reservoir pan in which a large cylindrical roller is mounted. The roller turns on an axle and picks up an amount of wet backing coating from the pan. The amount of pick-up is kept uniform by a scraping blade. The greige carpet travels over this whetted roller and the back coating is transferred to the carpet. A combination of direct pressure, capillary action and scraping blades are used to achieve the applied weights and penetration desired.

The back coating may also be sprayed with commercially available airless spraying systems onto the soft goods. Scrapers, doctor blades and rollers can be used to control application weights and penetration of the back coating into the soft goods. In all application methods the back coating is cured by a combination of time, temperature, and air exchange. This is most often accomplished in ovens heated by either gas or electricity. Curing temperatures range from 1000–350° F. and dwell time in ovens range from 5–30 minutes. The back coating can also be cured by infrared or microwave radiation, but this is not as common.

The formulation according to the present invention has many significant commercial advantages. It can be sold to the user in single package formulation so that no specialized application equipment required. This results in lower capitol cost and faster product introduction. No mixing is required which reduces labor costs and results in no mixing errors. Although it is a polyurethane formulation, workers are not exposed to isocyanates which increases worker safety.

Because the formulation is water based it has a very low initial toxicity and this provides for increased worker safety. It has low VOCs which reduces air pollution concerns, and the non-flammable formula results in increased fire safety. This fire resistance meets the FAA, CAA and JAA fireworthiness regulations so that nylon carpet can now be legally used worldwide. It also meets the Boeing and Airbus fireworthiness regulations, specifically the smoke and toxic gas requirements.

In designing a carpet backing formulation, difficulty exists in simultaneously meeting the vertical burn, smoke and toxicity provisions while additionally maintaining mechanical, application, environmental and cost properties required for a commercially acceptable material. This formulation successfully accomplishes this result by achieving vertical burn with a unique combination of materials and technology capable of delivering vertical burn performance without excessive smoke or toxicity characteristics.

The formulation has a high penetration ability when applied the nylon fibers and a high adhesion which locks in the carpet fibers. The formulation is tough, to assure dimensional stability and provide long service life. The formulation is also elastomeric so as to eliminate concerns about shrinkage.

It is understood that the foregoing detailed description is given merely by way of illustration and that many variations may be made therein without departing from the spirit of this invention.

Having thus described the invention, what is claimed as new and desired to be secured by letters patent is as follows:

1. A low smoke, fire resistant carpet comprising:
   carpet fibers adhered to a carpet backing including a polymeric binder having fire retardant components dispersed therein;
   said fire retardant components being present in a major proportion by weight in the polymeric binder and permitting the carpet to meet aircraft flammability, smoke generation and toxic gas emission standards;
   said fire retardant components comprising at least a fire retardant spumescent, a catalyst, and a char former;
   said backing being made from a formulation comprising a dispersion of said fire retardant components and said binder in a solvent having water as the major proportion; and
   said formulation being coated on said carpet fibers and cured to provide said fire resistant carpet.

2. The carpet according to claim 1, wherein the fibers of said carpet include nylon fibers.

3. The carpet according to claim 2, wherein said standards for smoke generation and toxic gas emissions are the Airbus ATS 1000.001/ABD 0031 issue 5 smoke emission and toxic gas standards.

4. The carpet according to claim 2 which when tested in accordance with the Airbus ATS 1000.001/ABD 0031 issue 5 smoke emission test methods, said carpet produces a resulting smoke with a specific optical density not greater than 200.

5. The carpet according to claim 2, wherein the flammability standard is the twelve second vertical burn test in FAR 25.853(a), Appendix F, Part 1, (a)(1)(ii).

6. The carpet according to claim 1, wherein said formulation further comprises a grinding aid mixed therein.

7. The carpet according to claim 1, wherein said formulation fuirther comprises a surfactant mixed therein.

8. The carpet according to claim 1, wherein said formulation further comprises a pigment mixed therein.

9. The carpet according to claim 1, wherein said formulation further comprises a filler mixed therein.

10. The carpet according to claim 1, wherein the fire retardant spumescent is melamine.

11. The carpet according to claim 1, wherein the catalyst is an ammonium polyphosphate.

12. The carpet according to claim 1, wherein the char former is a pentaerythritol.

13. The carpet according to claim 1, wherein the char former is a polysaccharide.

14. The carpet according to claim 1, wherein said polymeric binder is a polyurethane.

15. The carpet according to claim 14, wherein the polyurethane is selected from the group consisting of a polyurethane polyether, a polyurethane polyester and mixtures thereof.

16. The carpet according to claim 14, wherein the polyurethane is selected from the group consisting of an aliphatic polyurethane, an aromatic polyurethane and mixtures thereof.

17. The carpet according to claim 14, wherein the polyurethane solids are about 7–12% by weight of said formulation.

18. The carpet according to claim 1, wherein the fire retardant components are about 39–61% by weight of said formulation.

19. The carpet according to claim 1, wherein the solvent is at least about 22% by weight of said formulation.

20. The carpet according to claim 14, wherein said formulation comprises by weight:

| Component | % Range |
| --- | --- |
| solvent-free anionic aliphatic polyurethane dispersion in water | 18–30 |
| water | 5–15 |
| 2-Propanol | 3–6 |
| N-Methyl-2-Pyrrolidone | 1–4 |
| Acetylenic, diol-based dispersing agent | 0.5–1.5 |
| Polysaccharide resin | 4–9 |
| Melamine | 7–13 |
| Ammonium polyphosphate | 25–35 |
| Pentaerythritol | 7–13 |
| black iron oxide | 0.5–1.5 |
| defoamer | .01–1.0 |
| ethoxylated 2,4,7,9-tetramethyl-5-decyn-4,7-diol surfactant | .01–1.0 |
| 4% aqueous dispersion of clay filler | 2–6 |

21. The carpet according to claim 1, wherein the catalyst is an ammonium polyphosphate and the fire retardant spumescent is a melamine.

22. The carpet according to claim 21, wherein the polymeric binder is a polyurethane.

23. The carpet according to claim 22, wherein said formulation further comprises a filler, pigment and grinding aids mixed therein.

24. The carpet according to claim 22, wherein said formulation further comprises a surfactant mixed therein.

* * * * *

UNITED STATES PATENT AND TRADEMARK OFFICE
CERTIFICATE OF CORRECTION

PATENT NO. : 6,284,343 B1 Page 1 of 1
DATED : September 4, 2001
INVENTOR(S) : Dennis Maples et al.

It is certified that error appears in the above-identified patent and that said Letters Patent is hereby corrected as shown below:

<u>Column 7,</u>
Lines 11, delete "bum" and insert -- burn --.

Signed and Sealed this

Twelfth Day of March, 2002

Attest:

JAMES E. ROGAN
Attesting Officer  Director of the United States Patent and Trademark Office

(12) EX PARTE REEXAMINATION CERTIFICATE (6901st)
United States Patent
Maples et al.

(10) Number: US 6,284,343 C1
(45) Certificate Issued: Jun. 30, 2009

(54) LOW SMOKE, LOW TOXICITY CARPET

(75) Inventors: Dennis Maples, Bonner Springs, KS (US); George Danker, Olathe, KS (US); David Campanella, North Kansas City, MO (US)

(73) Assignee: Akro Fireguard Products, Inc., Lenexa, KS (US)

Reexamination Request:
No. 90/008,679, Jun. 6, 2007

Reexamination Certificate for:
Patent No.: 6,284,343
Issued: Sep. 4, 2001
Appl. No.: 09/419,856
Filed: Oct. 19, 1999

Certificate of Correction issued Mar. 12, 2002.

Related U.S. Application Data

(63) Continuation of application No. 09/060,791, filed on Apr. 15, 1998, now abandoned.

(51) Int. Cl.
*C08K 5/00* (2006.01)
*C08K 3/32* (2006.01)
*C08K 3/00* (2006.01)
*C08K 5/3492* (2006.01)
*C09K 21/00* (2006.01)
*C09K 21/14* (2006.01)
*D06N 7/00* (2006.01)
*B32B 33/00* (2006.01)

(52) U.S. Cl. .................. 428/97; 524/387; 524/416; 524/430; 524/56

(58) Field of Classification Search .................. None
See application file for complete search history.

(56) References Cited

U.S. PATENT DOCUMENTS 3,577,342 A * 5/1971 Fidell .................. 252/608
3,810,862 A   5/1974 Mathis et al.
3,990,977 A * 11/1976 Pearson .................. 252/602
4,173,671 A * 11/1979 Minhas et al. .............. 428/85
4,879,320 A   11/1989 Hastings
5,749,948 A * 5/1998 Scholz et al. ............ 106/18.15

FOREIGN PATENT DOCUMENTS

EP  391000   10/1989
JP  48-959   * 1/1973

OTHER PUBLICATIONS

Chang et al., "Flame Retardant Organic Coatings" in *Flame–Retardant Polymeric Materials,* Plenum Press (Lewin, Atlas and Pearce, eds.), New York, 1975, pp. 399–440.

Kandola, B.K. and Horrocks, A.R., "The Enhancement of Flame–Retardant Properties of Textiles by the Application of Intumescents," 17th IFVtCC Congress, Jun. 5–7, 1996, Vienna, Austria, pp. 265–268.

* cited by examiner

*Primary Examiner*—Alan Diamond

(57) ABSTRACT

A fire resistant carpet backing formulation has five components of:
  a) a polyurethane dispersion;
  b) fire retardant components having at least
    a) ammonium polyphosphate,
    b) melamine, and
    c) a char former;
  c) solvents including water;
  d) filler, pigment and grinding aids; and
  e) surfactants.

Preferred char formers are pentaerythritol and polysaccharides. The polyurethane dispersion is present in about 18–30% by weight, the fire retardant components of part (b) are present in about 39–61% by weight and the solvents of part (c) are present in about 9–25% by weight in the preferred embodiments. Nylon carpets made with this backing are fire retardant and meet the airline standards for fire safety.

**EX PARTE
REEXAMINATION CERTIFICATE
ISSUED UNDER 35 U.S.C. 307**

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–4 are cancelled.

Claims 1 and 5 are determined to be patentable as amended.

Claims 6–24, dependent on an amended claim, are determined to be patentable.

New claim 25 is added and determined to be patentable.

1. A low smoke, fire resistant carpet comprising:
   carpet fibers adhered to a carpet backing including a polymeric binder having fire retardant components dispersed therein, *the fibers of said carpet including nylon fibers*;
   said fire retardant components being present in a major proportion by weight in the polymeric binder and permitting the carpet to meet aircraft flammability, smoke generation and toxic gas emission standards, *said standards for smoke generation and toxic gas emissions comprising the Airbus ATS 1000.001/ABD 0031 issue 5 smoke emission and toxic gas standards*;
   said fire retardant components comprising at least a fire retardant spumescent, a catalyst, and a char former;
   said backing being made from a formulation comprising a dispersion of said fire retardant components and said binder in a solvent having water as the major proportion; and
   said formulation being coated on said carpet fibers and cured to provide said fire resistant carpet.

5. The carpet according to claim [2] *1*,wherein the flammability standard is the twelve second veritcal burn test in FAR 25.853(a), Appendix F, Part 1, (a)(1)(ii).

*25. A low smoke, fire resistant carpet comprising:*
   *carpet fibers adhered to a carpet backing including a polymeric binder having fire retardant components dispersed therein, the fibers of said carpet including nylon fibers;*
   *said fire retardant components being present in a major proportion by weight in the polymeric binder and permitting the carpet to meet aircraft flammability, smoke generation and toxic gas emission standards;*
   *said fire retardant components comprising at least a fire retardant spumescent, a catalyst, and a char former;*
   *said backing being made from a formulation comprising a dispersion of said fire retardant components and said binder in a solvent having water as the major proportion; and*
   *said formulation being coated on said carpet fibers and cured to provide said fire resistant carpet, which when tested in accordance with the Airbus ATS 1000.001/ ABD 0031 issue 5 smoke emission test methods, said carpet produces a resulting smoke with a specific optical density not greater than 200.*

\* \* \* \* \*